United States Patent [19]

Deichelbohrer

[11] Patent Number: 4,608,477
[45] Date of Patent: Aug. 26, 1986

[54] ELECTRIC ARC SAW APPARATUS

[75] Inventor: Paul R. Deichelbohrer, Richland, Wash.

[73] Assignee: The United States of America as represented by the United States Department of Energy, Washington, D.C.

[21] Appl. No.: 473,180

[22] Filed: Mar. 8, 1983

[51] Int. Cl.⁴ .................. B23K 37/02; B23D 45/16
[52] U.S. Cl. .................. 219/69 V; 30/388; 30/500; 204/129.7; 204/212; 219/69 R; 219/70
[58] Field of Search ............... 219/69 E, 69 R, 69 V, 219/70, 68; 204/129.7, 297 R, 212, 129.5; 30/122, 273, 388, 390, 391, 500

[56]  References Cited

U.S. PATENT DOCUMENTS

| Re. 20,035 | 7/1936 | Strobel | 219/69 V |
|---|---|---|---|
| 1,701,919 | 2/1929 | Grumplet | 219/69 V |
| 1,830,580 | 11/1931 | Wappat | 30/391 |
| 2,015,415 | 9/1935 | Steiner | 219/69 R |
| 2,228,664 | 1/1941 | Knouse et al. | 30/391 |
| 2,352,432 | 6/1944 | Harrington | 30/390 |
| 2,355,838 | 8/1944 | Young et al. | 219/69 V |
| 3,115,454 | 12/1963 | Robischung et al. | 219/69 V |
| 3,668,780 | 6/1972 | Cowdrey | 30/273 |
| 3,839,789 | 10/1974 | Valkosky | 30/273 |
| 4,128,940 | 12/1978 | Ong | 30/388 |
| 4,401,875 | 8/1983 | Schlienger et al. | 219/69 E |
| 4,406,064 | 9/1983 | Goss | 30/390 |
| 4,414,743 | 11/1983 | Pioch et al. | 30/390 |
| 4,428,120 | 1/1984 | Kobayashi et al. | 30/390 |

FOREIGN PATENT DOCUMENTS

| 1119260 | 3/1982 | Canada. | |
|---|---|---|---|
| 43-22835 | 11/1968 | Japan | 219/69 D |
| 852483 | 8/1981 | U.S.S.R. | 219/69 E |

Primary Examiner—Clarence L. Albritton
Assistant Examiner—Geoffrey S. Evans
Attorney, Agent, or Firm—Edward W. Nypaver; Robert Southworth, III; Judson R. Hightower

[57] ABSTRACT

A portable, hand held electric arc saw has a small frame for supporting an electrically conducting rotary blade which serves as an electrode for generating an electric arc to erode a workpiece. Electric current is supplied to the blade by biased brushes and a slip ring which are mounted in the frame. A pair of freely movable endless belts in the form of crawler treads stretched between two pulleys are used to facilitate movement of the electric arc saw. The pulleys are formed of dielectric material to electrically insulate the crawler treads from the frame.

7 Claims, 7 Drawing Figures

ELECTRIC ARC SAW APPARATUS

The U.S. Government has rights in this invention pursuant to Contract No. DE-AC06-77RL01030 between the U.S. Department of Energy and Rockwell International.

BACKGROUND OF THE INVENTION

This invention relates generally to a cutting apparatus and, more particularly, to a portable, hand-held electric arc saw for cutting metals by the electric arc erosion process.

Apparatus for cutting metal by the electric arc erosion process are known. While such known apparatus are adequate and serve the purpose for which they were designed, they possess certain disadvantages. For example, these known apparatus generally are cumbersome, massive devices, weighing several thousand pounds and require large, bulky frames as well as expensive and complex handling, actuating and control mechanisms or systems to manipulate the saw blade and accurately position the latter relative to the work. Moreover, the mounting frame is fixed so that the work must be positioned within the outline of the saw frame, thereby limiting the size and shape of the piece or pieces to be cut. Moreover, the workpiece must be clamped or otherwise fixedly secured against movement when engaged by the saw blade.

SUMMARY OF THE INVENTION

Accordingly, it is a primary object of the present invention to obviate the above noted shortcomings by providing a new and useful portable, hand-held electric arc saw capable of addressing and dissecting workpieces of any size.

Another object of this invention is to provide a new and useful electric arc saw that is lightweight, easy to handle, low in cost, rugged in construction, durable in use, and capable of dissecting various metals and/or combinations thereof.

In one aspect thereof, the portable, hand-held electric saw apparatus of the present invention is characterized by the provision of an electrically conducting, rotary blade mounted on a small frame and engagable with a workpiece of opposite polarity for generating an electric arc therebetween. Electrically conducting means are mounted on the frame for transmitting current to said blade and freely movable, work engagable mobile means are provided on said frame for facilitating movement of the apparatus relative to the workpiece to be dissected.

These and other objects, advantages, and characterizing features of the present invention will become clearly apparent from the ensuing detailed description of an illustrative embodiment thereof, taken together with the accompanying drawings wherein like reference characters denote like parts throughout the various views.

BRIEF DESCRIPTION OF THE DRAWINGS

FIG. 6 is a horizontal sectional view, on an enlarged scale, taken along line 6—6 of FIG. 2; and FIG. 7 is an enlarged elevational view, showing details of the brush holder assembly.

DETAILED DESCRIPTION OF THE PREFERRED EMBODIMENT

Figure 1:
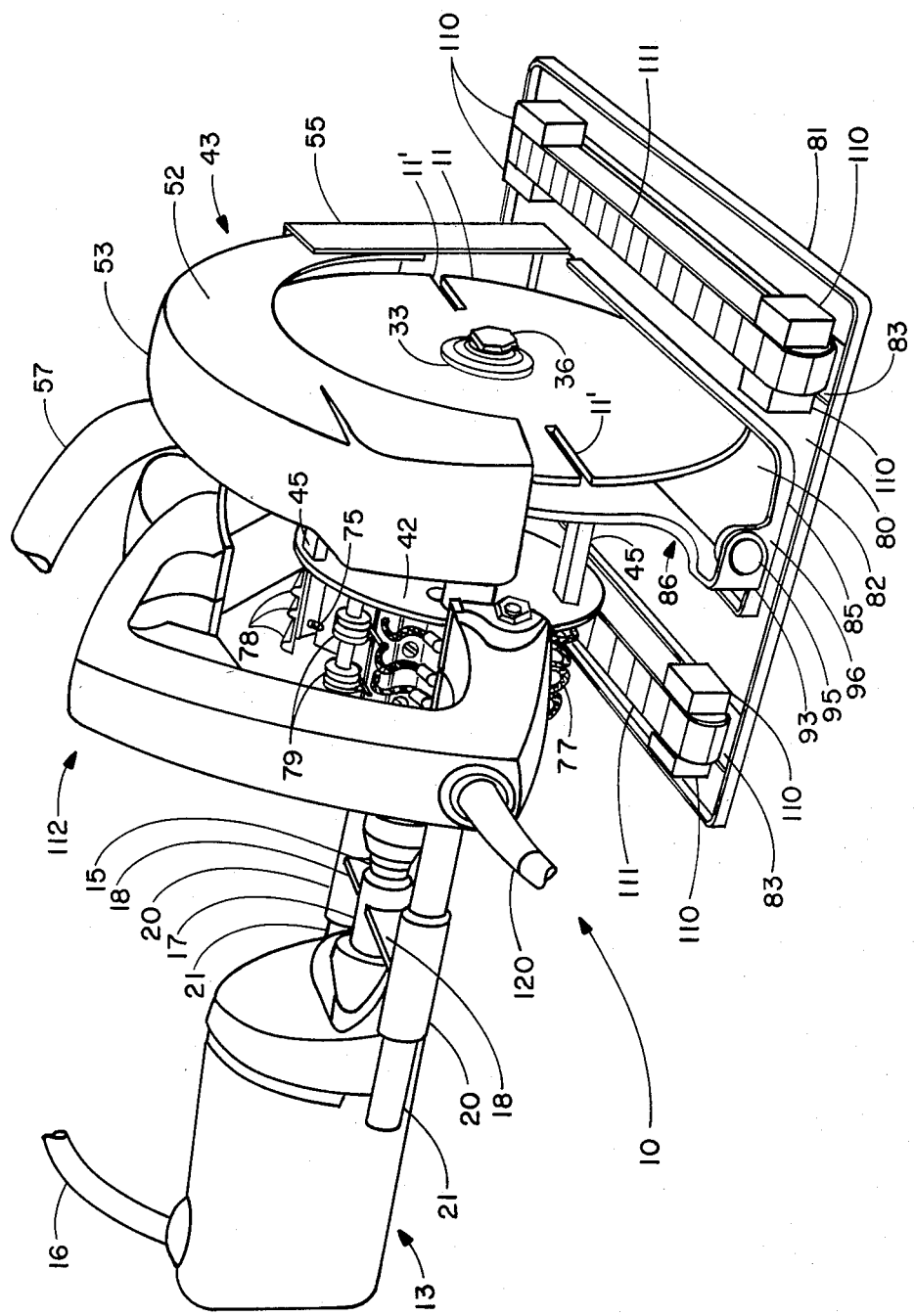
FIG. 1 is a perspective view of a portable electric arc saw apparatus constructed in accordance with this invention.

Referring now in detail to the illustrative embodiment depicted in the accompanying drawings, there is shown in FIG. 1 a portable, hand held and guided electric arc saw apparatus, comprehensively designated 10, constructed in accordance with this invention, and comprising a rotary blade 11 rigidly secured to a rotatable shaft 12 (FIG. 2) operatively connected to a drive unit 13. The unit 13 houses the usual motor and gear reduction mechanism (not shown) and is provided with an output shaft 15. Preferably, the motor is an electrical motor connected via conductor 16 and means hereinafter described to a suitable source of electrical power (not shown). However, the motor can be driven by a suitable air pressure or hydraulic fluid source, if desired. In any event, the motor and gear reducer are conventional and since they do not, per se, form a part of this invention, no further amplification or description thereof is believed necessary.

Figure 2:
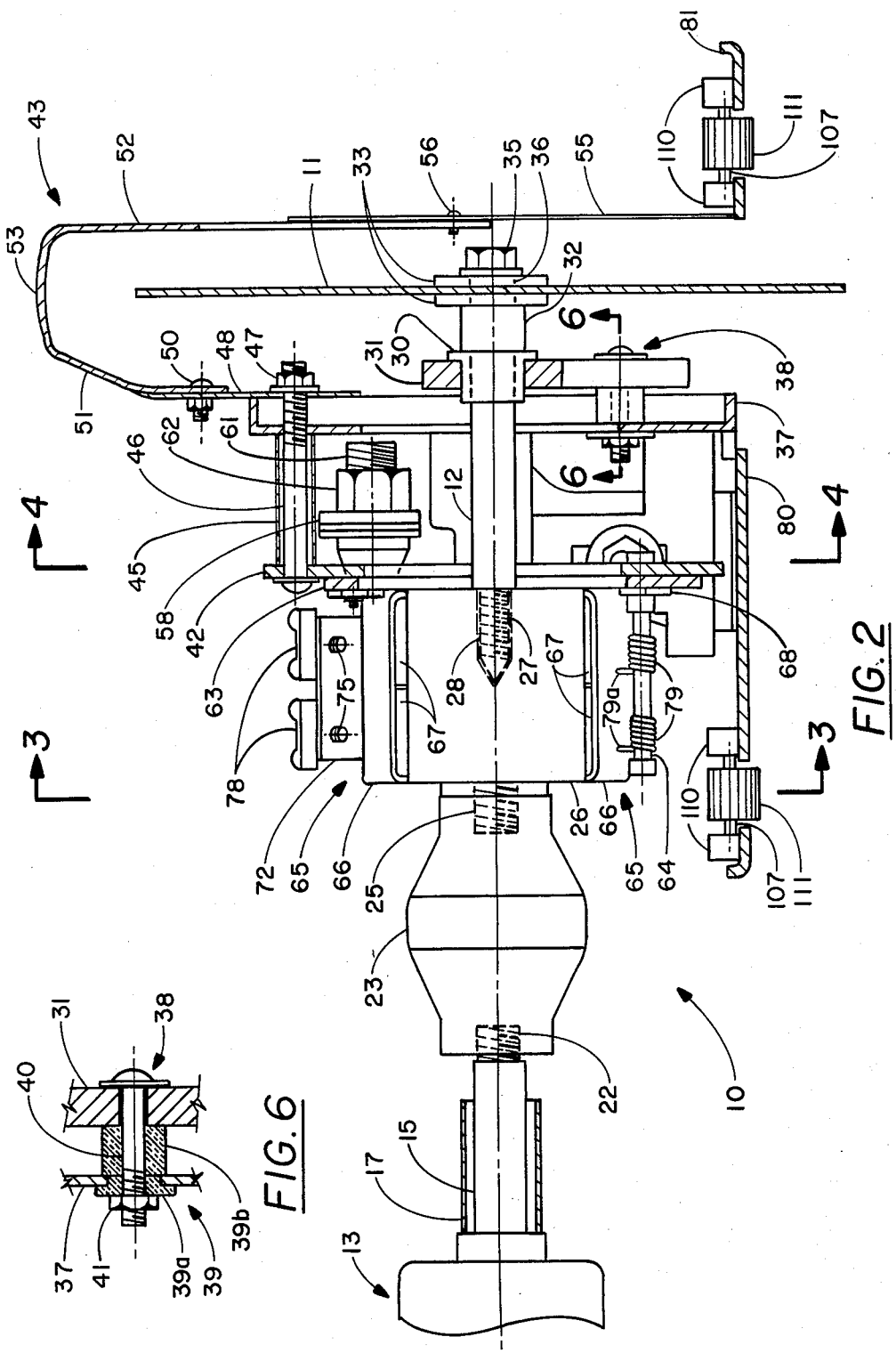
FIG. 2 is a longitudinal sectional view, on an enlarged scale, of the electric arc saw apparatus of FIG. 1.

The output shaft 15 is journaled for rotation in a sleeve bearing 17 supported by laterally extending webs 18, in turn connected to bushings 20 fixedly mounted on rods 21 constituting a part of the frame for the saw apparatus 10. As shown in FIG. 2, shaft 15 is rigidly secured, as by a threaded connection 22, to one end of a flexible coupling 23 formed of rubber or any other suitable resiliently yieldable, electrical insulating material. The other end of coupling 23 is secured, as by a threaded connection 25, to one end face of a cylindrical slip ring 26. The other end face of slip ring 26 is formed with a tapped opening 27 for receiving the threaded end portion 28 of shaft 12. The shaft 12 is jounaled for rotation in a bushing 30 mounted in an elongated bearing plate 31 and abuts against an enlarged diameter portion 32 of shaft 12. The blade 11 is mounted on shaft 12 between a pair of lock washers 33 and secured in place by a bolt 35 threaded into the end portion 36 of shaft 12.

Figure 4:
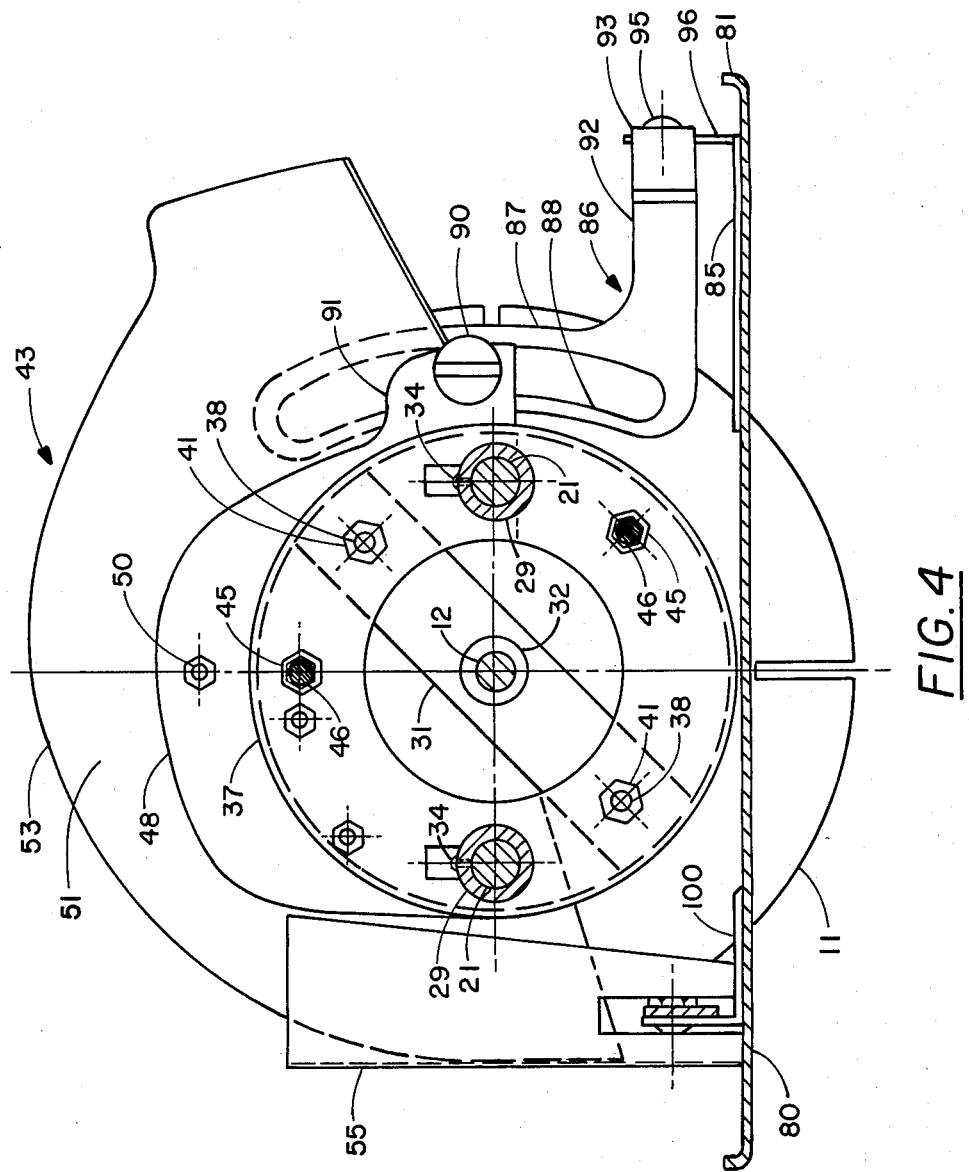
FIG. 4 is a vertical sectional view, taken along line 4—4 of FIG. 2.

The plate 31 (FIGS. 2 and 4) is attached adjacent its opposite ends to a base member 37 by connecting means 38 which includes a composite two-piece insulator 39 (FIG. 6) having a first section 39a in the form of a bushing extending through member 37 and an enlarged diameter flange portion resting against one face of member 37. The other insulator section 39b is in the form of a disk interposed between the other face of member 37 and plate 31. These sections 39a and 39b are suitably bored to receive a bolt 40 which also extends through the base member 31. A nut 41 is threaded onto bolt 40 and tightened against insulator section 39a to secure the assembly in place. The sections 39a and 39b can be formed of any suitable dielectric material, such as alumina for example, to electrically insulate member 31 from the remainder of the apparatus 10.

The base member 37, which constitutes a part of the apparatus frame, is formed with integral bushings 29 (FIG. 4) for receiving the end portions of rods 21, respectively. Member 37 is detachably secured to the rods 21 by set screws 34 which extend through the bushings 29 and against the rods 21. The base member 37 also serves to support a brush holder support plate 42 and indirectly a portion of the shroud 43 for the blade 11. The support plate 42, which is formed of a suitable electrical insulating material, is maintained in an axially spaced relation from base member 37 by a plurality of elongated spacers 45 which also receive therethrough the bolts 46 for fastening the member 37 and plate 42 together. In the illustrative embodiment depicted in the drawings, three such spacers 45 and bolts 46 are employed in circumferentially spaced relation about the member 42 and are provided with suitable nuts 47. As shown in FIG. 2, at least one of the bolts 46 extends through a mounting bracket 48 for securing the same to member 37. The bracket 48 is connected, as by a fastener 50, to the inner wall of shroud 43 for securing the latter in place.

The shroud 43 is of a generally U-shaped configuration in cross-section and comprises an inner arcuate wall portion 51, an outer arcuate wall portion 52 and a bight portion 53 disposed in a spaced relation to the opposite surfaces and peripheral edge, respectively, of the blade 11. This shroud 43 covers approximately ⅔rds of the upper portion of the blade 11 to protect the operator from the sparks and molten debris generated by the electric arc erosion process. The inner wall 51 of shroud 43 is rigidly secured to a metal plate 55, as by fastener 56, to reinforce the shroud 43 and shield a rear portion of blade 11.

Figure 5:
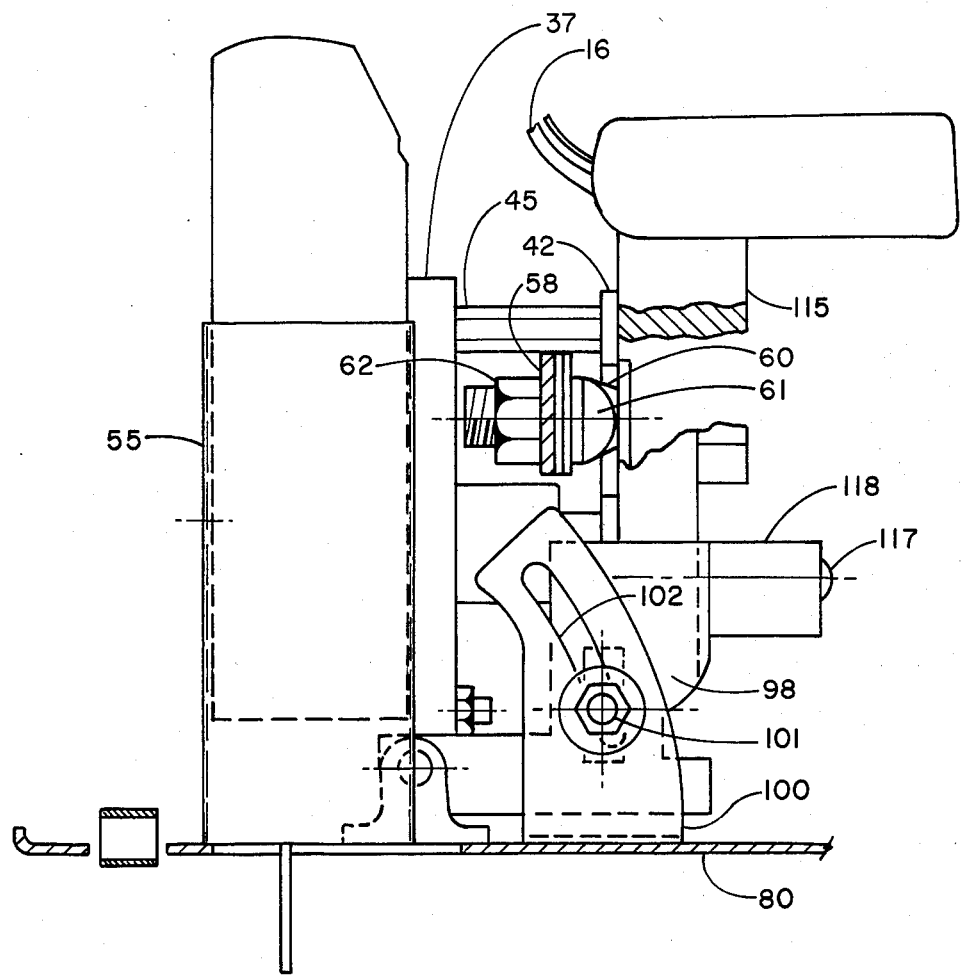
FIG. 5 is a vertical sectional view, taken along line 5—5 of FIG. 3.

Means are provided to deliver electric current to the electrically conductive saw blade 11, such means including a cable 57 connected at one end thereof to a suitable source of electrical power (not shown) and having at the other end thereof a lug 58 (FIGS. 2 and 5) attached onto a terminal 60. The terminal 60 is formed with a threaded portion 61 for receiving a nut 62 to releaseably secure the cable lug 58 thereto. The terminal 60 is welded or otherwise fixedly secured at its other end to an electrically conducting plate 63 affixed to insulated plate 42 by elongated bolts 46.

Four brush holder assemblies 65 are detachably mounted on the support plate 63 at equally spaced intervals circumferentially about the slip ring 26. Each holder assembly 65 has a rectangularly shaped, open ended holder 66 of box-like configuration for containing two brushes 67 engagable against the circumferential surface of slip ring 26. While four assemblies 65 and thereby eight brushes 67 are employed in the illustrated embodiment, it should be appreciated that more or less than eight brushes can be utilized as dictated by current requirements.

The inner end of each holder 66 is formed with right angularly related tabs 68 each having a suitable aperture fitted about a machine screw 70 projecting axially from plate 63. A nut 71 is threaded onto one of the screws 70 for securing tab 68 and thereby holder 66 in place. The closed end of holder 66 also is provided with a flange 72 having tapped openings therein for receiving screws 75 (FIG. 2 and 7) adapted to secure the terminal portions 76 of leads 77 thereto. The leads 77 extend into and are rigidly secured to the associated brushes 67, respectively, with the outer portions thereof terminating in lugs 78. Thus, electrical current is delivered to the blade 11 via cable 57, terminal 60, plate 63, tabs 68, holders 66, flanges 72, leads 77, brushes 67, slip ring 26 and shaft 12. This electrical path is electrically insulated from the remainder of apparatus 10 by the flexible coupling 23 and connectors 38.

Means are provided for biasing the brushes 67 against the periphery of slip ring 26, such means including a pair of helical springs 79 mounted on each cylindrical spring retainer 64. The retainer 64 is formed with a tapped opening at its inner end for threaded engagement with the screw 70 affixed to plate 63. Each of these springs 78 is formed with two projecting legs 79a and 79b adapted to exert a force against the outer surface and side wall, respectively, of each holder 66.

Apparatus 10 is provided with a base member or shoe 80 of generally square or rectangular outline in plan and which is formed with an upstanding rim 81 along the periphery thereof. The shoe 80 is formed with a slot 82 for accommodating the blade 11 and a pair of slots 83 on opposite sides of slot 82 for receiving mobile means hereinafter more fully explained. A rail 85 is provided on the shoe 80 along the periphery of slot 82 and extends about a portion of the blade 11.

Means are provided for supporting the shoe 80 on apparatus 10, such means including a specially configurated support bracket 86 (FIGS. 1 and 4) having an upstanding, arcuately shaped portion 87 formed with an elongated slot 88 for receiving a fastener 90 securing the bracket 86 to an extension 91 of bracket 48. The lower portion 92 of support bracket 86 extends horizontally and is formed with a hooked portion 93 secured by a fastener 95 to an upstanding lug 96 formed on the rail 85.

The opposite end of the shoe 80 is supported by a bracket 97 attached to rod 21 and having a right angularly related portion 98 affixed to an angle bracket 100 welded or otherwise fixedly secured at its base to the shoe 80. A bolt 101 extends through an arcuate slot 102 formed in bracket 100 to secure the latter to bracket 97. The slot 88 permits the blade 11 to be raised or lowered relative to shoe 80 to adjust the extent of blade 11 projecting below shoe 80, as desired. The slot 102 permits the angle between the blade and the shoe to be adjusted from a 90° orientation as shown, to an angular attitude of 45° to provide for chamfer cutting. Thus, the shoe 80, which serves as a guide for positioning the apparatus on the workpiece is firmly attached at its opposite ends to the apparatus frame and can be adjusted relative to the blade 11 as described above.

Figure 3:
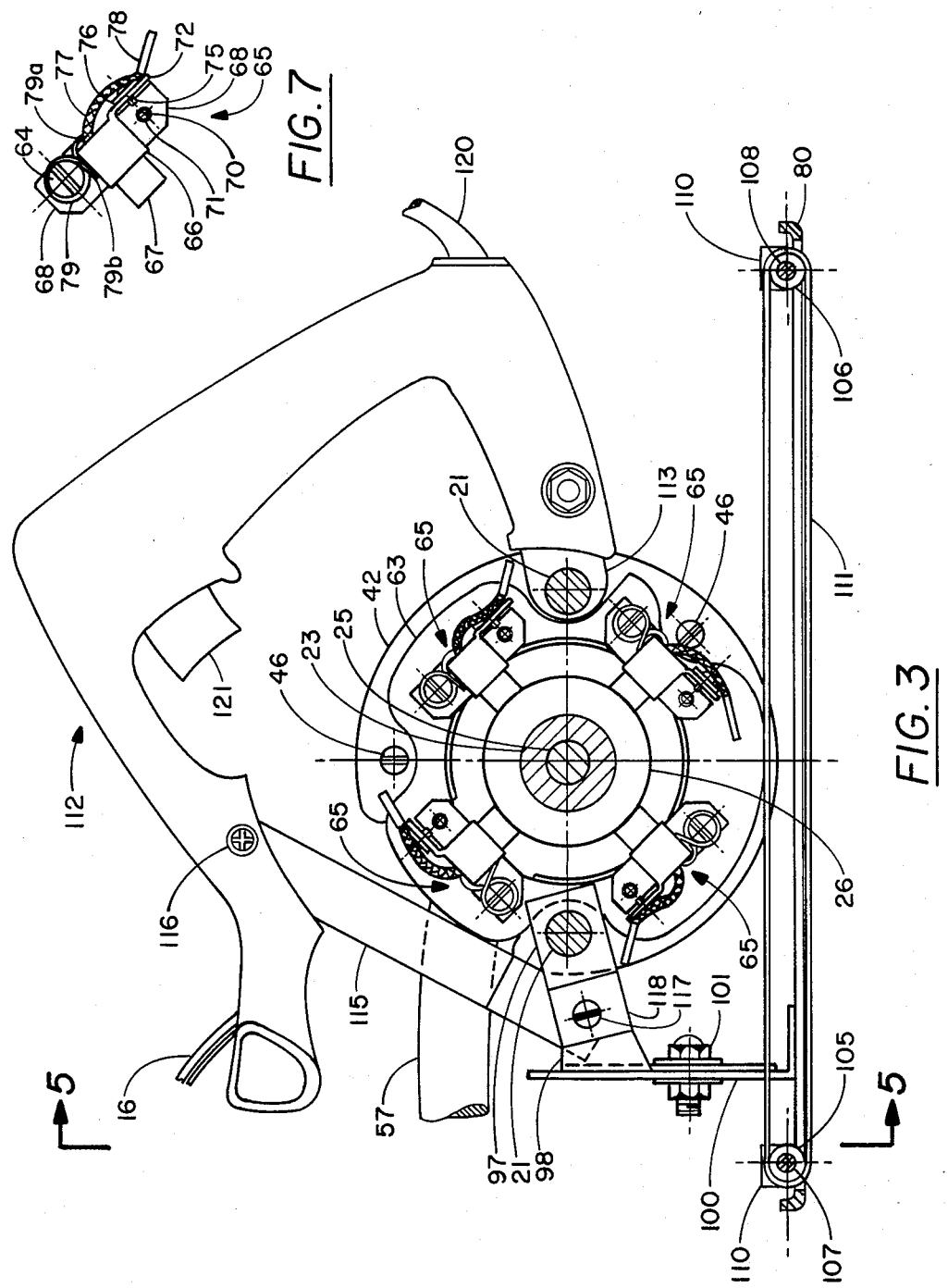
FIG. 3 is a vertical sectional view, taken along line 3—3 of FIG. 2.

Mobile means are provided for facilitating sliding movement of the apparatus 10 relative to the workpiece to be severed. To this end, a pair of pulleys 105 and 106 (FIG. 3), formed of a suitable electrically insulating material, are provided at each opposite end of the shoe and are mounted on shafts 107 and 108 journaled for rotation in bearing blocks 110 rigidly secured to the upper surface of shoe 80. An articulated endless belt 111, formed of a plurality of crawler treads, is entrained about each pair of oppositely disposed pulleys 105 and 106. The two belts 111 are disposed in a parallel relation on opposite sides of the blade 11 and are mounted for free movement in orbital paths about their respective pulleys. The belts 111 are adapted to engage and travel along the workpiece, supporting the shoe thereabove in spaced relation from the workpiece and the scale, slag and burrs normally generated during cutting. The shoe and the remainder of the apparatus are electrically insulated from the electrically conductive work engaging belts 111 by means of the pulleys 105 and 106 which are formed of a dielectric material. If desired, the shafts 107 and 108, bearing blocks 110 and/or belts 111 can also be formed of an electrically insulating material in addition to, or in lieu of, the insulated pulleys 105 and 106. The tracks or belts 111 facilitate smooth feeding movement of the apparatus 10 along the workpiece and assist in preventing the rear portion of the blade 11 from contacting the sides of the kerf.

Apparatus 10 is provided with a generally U-shaped handle 112 preferably located over the center of gravity of the apparatus. The lower end of the handle 112 is formed with a lug 113 secured to one of the rods 21. The other end of handle 112 is secured to an elongated arm 115 by fastener 116, the lower end of the arm 115 being attached by screw 117 to a block 118 connected to the bracket 97. An electrical lead 120, connected to a suitable source of electrical power (not shown), extends into handle 112 and is operatively connected to a suitable control circuit (also not shown) mounted within handle 112. This circuit is energized by a trigger-type actuator 121 for controlling via lead 16 the motor within drive unit 13 and consequently the operation and speed of the shaft 12 and thereby blade 11.

In operation, the terminal of the positive lead from the power source is connected to the workpiece to be dismantled or dissected, which workpiece can be a large, bulky item such as an automotive body, a glove box structure or a tank for example. Upon energizing the power supply and depressing trigger 121 to activate rotation, the operator positions the hand-held apparatus 10 on the workpiece with the forward end of the belts 111 immediately ahead of the blade engaging the workpiece. The apparatus is moved forwardly toward the intended line of cut until the rotating blade 11 contacts the workpiece to initiate an electric current flow through the electric potential between the negative blade and positive workpiece. When the blade first contacts the workpiece, forward movement of apparatus 10 is temporarily halted to permit metal heat up. When the metal workpiece has reached a sufficiently high temperature, the apparatus 10 is advanced to form a kerf in the workpiece along the intended line of cut. Cutting of the metal is accomplished by electric arc erosion. This erosion is effected by the current flow which sustains an electric arc between the blade and the workpiece to melt or soften the metallic workpiece in the region adjacent the leading edge of the blade, forming a kerf along the line of cut. The softened material is expelled from the kerf by the rotating blade. The arc erosion is concentrated on the workpiece rather than the blade since the arc is localized in the cutting zone to a small region or area only of the workpiece, which is constantly absorbing heat. On the other hand, the blade is continuously moving so that before a given increment thereof becomes very hot, it travels out of the cutting zone and cools as it rotates about the axis of the blade.

The electric voltage differential applied between the blade and workpeice typically is between 18 and 30 volts. Cutting current depends upon the workpiece thickness and the feed rate of the apparatus and currents ranging from 50 to 1000 amperes have been observed in practice.

The metal blade 11 preferably is formed of a suitable, heat treatable metal, such as tool steel for example. In order to significantly minimize, if not eliminate, warping due to the elevated temperatures encountered, tension is imparted to the blade 11. This is accomplished by forming slots 11' from the peripheral edge thereof radially inwardly toward the axis of the blade 11. While preferably four such slots are formed in the blade at equal circumferentially spaced distances, it should be appreciated that more or less than four slots may be employed within the purview of this invention.

The electric saw apparatus of this invention has proven effective in cutting various metals or combinations thereof having bulky and irregular shapes of thicknesses varying up to a half-inch. Moreover, the apparatus can cut steel or stainless steel plate backed by concrete. While the subject apparatus is especially suited for dismantling slightly contaminated equipment, such as radioactive glove boxes for example, it has utility in a variety of applications, including dissecting undisciplined workpieces such as junked automobile bodies, waste tanks or in any other demolition operation.

It is to be understood that the form of the invention herewith shown and described is to be taken as an illustrative embodiment only of the same, and that various changes in the shape, size and arrangement of parts may be resorted to without departing from the spirit of the invention.

I claim:

1. A portable hand-held electric arc saw apparatus comprising: a frame, means for mounting a rotatable shaft on said frame, an electrically conducting blade rigidly secured to said shaft and engagable with a workpiece of opposite polarity for generating an electric arc therebetween, electrically conducting means mounted on said frame for transmitting current to said blade and including a slip ring secured to said shaft, a plurality of brushes mounted on said frame and having inner ends engaging the periphery of said slip ring, a handle mounted on said frame for facilitating handling and guidance of said blade relative to said workpiece, a base member mounted on said frame and having a slot therein for accommodating said blade, means for adjustably mounting said blade for varying the extent of blade projection past said base member, mobile means projecting through said member and engagable with said workpiece for facilitating movement of said apparatus relative to said workpiece, and means for electrically insulating said mobile means from said base member.

2. An apparatus according to claim 1, wherein said blade is of a generally circular configuration formed with circumferentially spaced slots extending from the periphery of said blade toward the axis thereof.

3. An apparatus according to claim 1, including means for biasing said brushes into engagement with said slip ring.

4. An apparatus according to claim 1, including means for electrically insulating said electrically conducting means from said frame.

5. An apparatus according to claim 1, wherein said mobile means comprises a pair of articulated crawler treads freely movable in orbital paths and projecting below said base member for facilitating movement of said blade relative to said workpiece.

6. An apparatus according to claim 1, wherein the voltage differential applied between said blade and said workpiece is in the range of 18 to 30 volts.

7. An apparatus according to claim 1 wherein the magnitude of the current ranges from 50 to 1000 amperes.

* * * * *